US012300141B2

(12) United States Patent
Chun et al.

(10) Patent No.: US 12,300,141 B2
(45) Date of Patent: May 13, 2025

(54) DISPLAY DEVICE

(71) Applicant: LG Display Co., Ltd., Seoul (KR)

(72) Inventors: Minkyu Chun, Seoul (KR); JunHee Han, Gimpo-si (KR); Sangwon Yoon, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/234,262

(22) Filed: Aug. 15, 2023

(65) Prior Publication Data

US 2024/0212554 A1 Jun. 27, 2024

(30) Foreign Application Priority Data

Dec. 22, 2022 (KR) ........................ 10-2022-0181666

(51) Int. Cl.
*G09G 3/20* (2006.01)
*G09G 3/3233* (2016.01)

(52) U.S. Cl.
CPC ......... *G09G 3/2003* (2013.01); *G09G 3/3233* (2013.01); *G09G 2300/0426* (2013.01); *G09G 2300/0452* (2013.01); *G09G 2330/021* (2013.01)

(58) Field of Classification Search
CPC ... G09G 2300/0426; G09G 2300/0452; G09G 2330/021; G09G 3/2003; G09G 3/3233; G09G 3/3275; G09G 3/3685; G09G 2310/0275; G09G 2310/0294; G09G 2310/0297
See application file for complete search history.

(56) References Cited

U.S. PATENT DOCUMENTS

2014/0175977 A1* 6/2014 Yoon .................... H10K 59/131 315/51
2015/0129853 A1* 5/2015 Shin ..................... H10K 59/131 438/35

FOREIGN PATENT DOCUMENTS

KR 10-2017-0136484 A 12/2017

* cited by examiner

*Primary Examiner* — Robin J Mishler
(74) *Attorney, Agent, or Firm* — Birch, Stewart, Kolasch & Birch, LLP

(57) ABSTRACT

A display device can include a display panel having an active area and a non-active area, a plurality of data lines and driving voltage lines disposed in the active area, a plurality of first link lines disposed in the non-active area and respectively connected to the plurality of data lines, and one second link line disposed over the plurality of first link lines and connected to a part of the plurality of driving voltage lines. As a result, quality of the display panel can be improved, and a total resistance of the driving voltage lines can be reduced, so that power consumption of the display panel can be reduced.

21 Claims, 12 Drawing Sheets

DISPLAY DEVICE

CROSS-REFERENCE TO RELATED APPLICATIONS

This application claims priority, under 35 U.S.C. § 119, to Korean Patent Application No. 10-2022-0181666 filed on Dec. 22, 2022 in the Republic of Korea, the entire contents of which are hereby expressly incorporated by reference into the present application.

BACKGROUND

Technical Field

The present disclosure relates to a display device with a reduced parasitic capacitance.

Discussion of the Related Art

Recently, as our society advances toward an information-oriented society, the field of display devices for visually expressing an electrical information signal has rapidly advanced. As a result, various display devices having excellent performance in terms of thinness, lightness, and low power consumption, are being developed.

Representative display devices include a liquid crystal display device (LCD), an electro-wetting display device (EWD), and an organic light emitting display device (OLED).

Among the display devices, an electroluminescent display device including the organic light emitting display device is a self-luminous display device and can be manufactured to be light and thin since it does not require a separate light source, unlike the liquid crystal display device having a separate light source.

In addition, the electroluminescent display device has advantages in terms of power consumption due to a low voltage driving, and is excellent in terms of a color implementation, a response speed, a viewing angle, and a contrast ratio (CR). Therefore, electroluminescent display devices have been expected to be used in various application fields.

When operating such display devices, however, the operation quality may be affected due to some characteristics of the elements used in the display device. For instance, parasitic capacitance between signal lines (e.g., a data line and a driving voltage line) may affect the performance of the display device.

SUMMARY OF THE DISCLOSURE

An object to be achieved by the present disclosure is to provide a display device in which a parasitic capacitance between a data line and a driving voltage line is reduced and differences in parasitic capacitance in respective sub-pixels are reduced, which improves the performance of the display device.

Objects of the present disclosure are not limited to the above-mentioned objects, and other objects, which are not mentioned above, can be clearly understood by those skilled in the art from the following descriptions.

A display device according to an exemplary embodiment of the present disclosure can include a display panel including an active area and a non-active area, a plurality of data lines and driving voltage lines disposed in the active area, a plurality of first link lines disposed in the non-active area and connected to the plurality of data lines, respectively and a second link line disposed over the plurality of first link lines and connected to a part of the plurality of driving voltage lines.

Other detailed matters of the exemplary embodiments are included in the detailed description and the drawings.

According to the present disclosure, by reducing a parasitic capacitance between a data line (a first link line) and a driving voltage line (a second link line) in a link unit, and also reducing a difference in parasitic capacitance in respective sub-pixels, it is possible to reduce imbalance of sensed values of driving transistors. For instance, in one example, a link unit includes a plurality of first link lines and a second link line, or includes a plurality of first link lines, a plurality of auxiliary link lines and a second link line. As a result, the quality of a display panel can be improved, and a total resistance of the driving voltage lines can be reduced, so that power consumption of the display panel can be reduced and the performance of the display device can be improved.

The effects according to the present disclosure are not limited to the contents exemplified above, and more various effects are included in the present specification.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
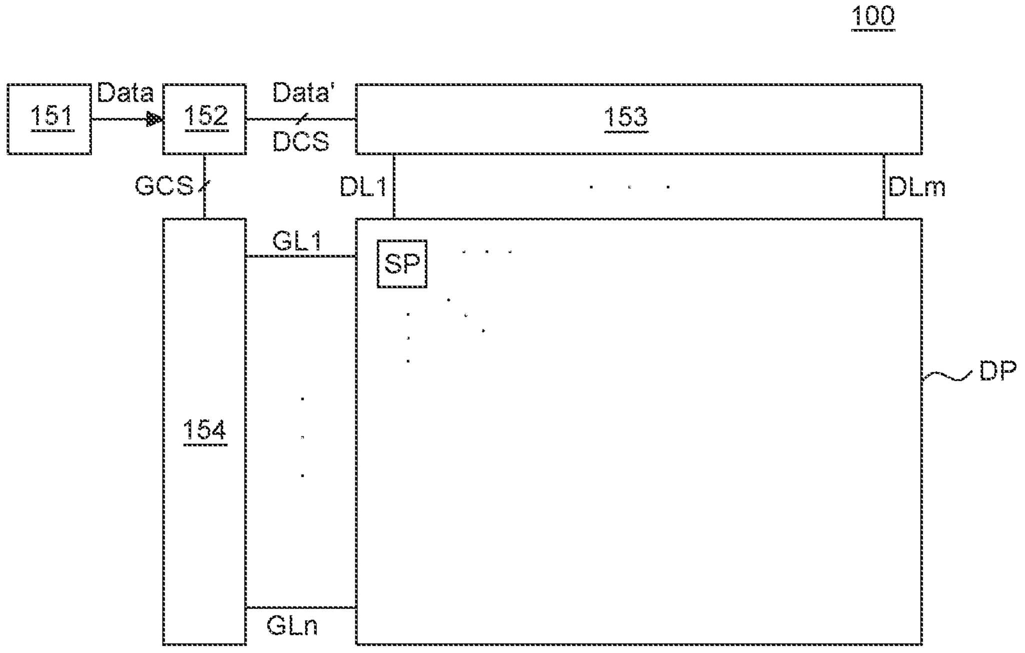
FIG. 1 is a schematic configuration diagram of a display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies can be omitted to avoid unnecessarily obscuring the subject matter of the present disclosure. The terms such as "including," "having," "comprising," etc. used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on," "over," "under," "above," "below," "beneath," "near," "close to," "adjacent to," "beside," "next to," or the like, one or more parts can be positioned between the two parts unless the terms are used with the term "immediately" or "directly".

When an element or layer is disposed "on" or "over" another element or layer, another layer(s) or another element(s) can be interposed directly on the other element or therebetween.

Although the terms "first," "second," and the like are used for describing various components, these components are not confined by these terms. These terms are merely used for distinguishing one component from the other components and may not define order or sequence. Therefore, a first component to be mentioned below can be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The word "exemplary" is used to mean serving as an example or illustration, unless otherwise specified. Embodiments are example embodiments. Aspects are example aspects. Any implementation described herein as an "example" is not necessarily to be construed as preferred or advantageous over other implementations.

Where an element or layer is described to as "coupled," "connected," "attached," or "adhered" to another element or layer, the element or layer can be directly connected, coupled, attached, or adhered to another element or layer, or also can be indirectly connected, coupled, attached, or adhered to another element or layer with one or more intervening elements or layers disposed or interposed between the elements or layers, unless otherwise specified. Such also includes an electrical connection.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to the accompanying drawings. All the components of each display device according to all embodiments of the present disclosure are operatively coupled and configured.

FIG. 1 is a schematic configuration diagram of a display device according to an exemplary embodiment of the present disclosure.

Referring to FIG. 1, a display device 100 according to the exemplary embodiment of the present disclosure can include a display panel DP, a data driver 153, a gate driver 154, and a timing controller 152.

In the display panel DP, a plurality of data lines DL1, . . . , and DLm (m is a natural number greater than or equal to 2) can be disposed in a first direction, and a plurality of gate lines GL1, . . . , and GLn (n is a natural number greater than or equal to 2) can be disposed in a second direction crossing the first direction. As an example, the first and second directions can be perpendicular to each other, but other variations are possible.

A plurality of sub-pixels SP can be disposed in a matrix form on the display panel DP.

For example, the data driver 153 can supply data voltages to the plurality of data lines DL1, . . . , and DLm to drive the plurality of data lines DL1, . . . , and DLm. Further, the gate driver 154 can sequentially supply scan signals to the plurality of gate lines GL1, . . . , and GLn to sequentially drive the plurality of gate lines GL1, . . . , and GLn.

The timing controller 152 can supply control signals DCS and GCS to the data driver 153 and the gate driver 154 respectively to control operations of the data driver 153 and the gate driver 154.

In addition, the timing controller 152 can start scanning according to a timing implemented in each frame, convert image data Data input from a host system 151 in accordance with a data signal format that is used by the data driver 153 to output converted image data Data', and control data for driving (e.g., data control signals DCS) at an appropriate time in accordance with the scanning.

In addition, the gate driver 154 can sequentially supply scan signals of an on-voltage or an off-voltage to the plurality of gate lines GL1, . . . , and GLn under the control of the timing controller 152, and sequentially drive the plurality of gate lines GL1, . . . , and GLn.

For example, the gate driver 154 can be located only on one side of the display panel DP, as shown in FIG. 1, depending on a driving method, or can be located on both sides of the display panel DP in some cases. However, other variations are possible.

In addition, the gate driver 154 can include a plurality of gate driver integrated circuits (gate driver ICs). For example, the gate driver integrated circuit can be connected to a bonding pad of the display panel DP by a tape automated bonding (TAB) method or a chip-on-glass (COG) method, or can be implemented in a gate in panel (GIP) method and be directly disposed on the display panel DP. Also, in some cases, the gate driver integrated circuit can be disposed to be integrated with the display panel DP.

Figure 2:
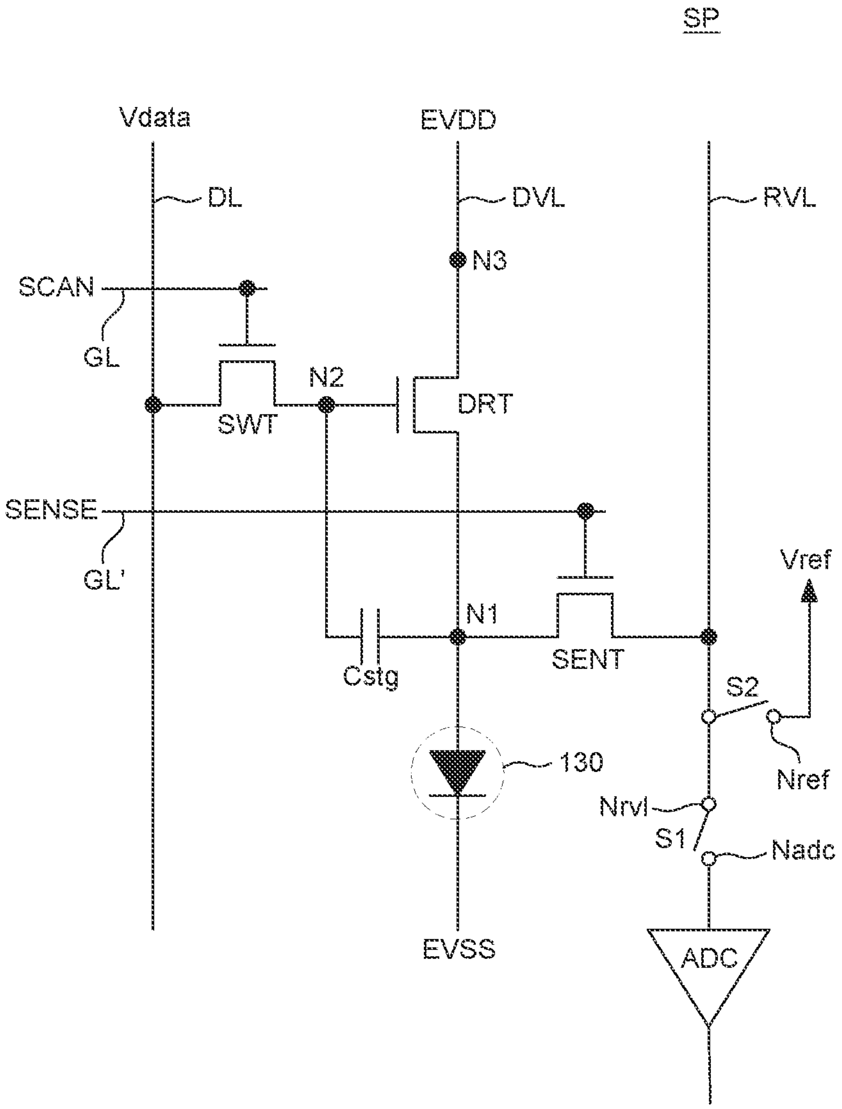
FIG. 2 is an equivalent circuit diagram of an example of a sub-pixel of the display device of FIG. 1.

In addition, the data driver 153 can convert the image data Data' received from the timing controller 152 into a data voltage Vdata (as shown in FIG. 2) in an analog format when a specific gate line GL1, . . . , or GLn is opened (e.g., turned on), and can supply the converted voltage to the plurality of data lines DL1, . . . , and DLm to drive the data lines DL1, . . . , and DLm.

The data driver 153 can include a plurality of source driver integrated circuits (also referred to as data driver ICs). For example, the source driver integrated circuit can be connected to a bonding pad of the display panel DP by a tape automated bonding (TAB) method or a chip-on-glass (COG)

method, or can be directly disposed on the display panel DP. Also, depending on cases, the source driver integrated circuit can be disposed to be integrated with the display panel DP.

Each of the plurality of source driver integrated circuits mentioned above can include one or more of a shift register, a latch, a digital analog converter (DAC), an output buffer, and the like. For example, the source driver integrated circuit can further include an analog-to-digital converter (ADC) that senses an analog voltage value for sub-pixel compensation (called luminance deviation compensation or data compensation), converts it into a digital value, and generates and outputs sensing data.

The plurality of source driver integrated circuits can be implemented, for example, in a chip-on-film (COF) method. In each of the plurality of source driver integrated circuits, for example, one end thereof can be bonded to at least one source printed circuit board (S-PCB), and the other end (or another end) thereof can be bonded to a bonding pad portion of the display panel DP.

The aforementioned host system 151 can transmit various timing signals including a vertical synchronization signal Vsync, a horizontal synchronization signal Hsync, an input data enable (DE) signal, a clock signal CLK, and the like, along with image data Data of an input image, to the timing controller 152.

For example, the timing controller 152 converts the image data Data received from the host system 151 in accordance with the data signal format used by the data driver 153 and outputs the converted image data Data'. In addition to this, to control the data driver 153 and the gate driver 154, the timing controller 152 can receive timing signals such as a vertical synchronization signal Vsync, a horizontal synchronization signal Hsync, an input DE signal, and a clock signal, etc., generate various control signals, and output them to the data driver 153 and the gate driver 154.

Referring to FIG. 1, the display device 100 can further include a power controller that supplies various voltages or currents to the display panel DP, the data driver 153, the gate driver 154, and the like, or controls the various voltages or currents to be supplied. The display device 100 can further include other elements/circuits to provide enhanced functions.

FIG. 2 is an example of an equivalent circuit diagram of a sub-pixel of the display device of FIG. 1. The sub-pixel configuration of FIG. 2 can be used in any sub-pixel in the display device of FIG. 1 or in any sub-pixel in each display device according to all embodiments of the present disclosure.

Referring to FIG. 2, a driving transistor DRT for driving a light emitting element 130' can be disposed, basically in each sub-pixel SP of the display panel. The driving transistor DRT can have intrinsic characteristics such as a threshold voltage and mobility.

However, the driving transistor DRT can be degraded as a driving time increases, and thus, can have a change in its characteristics. Since the degree of degradation is generally different for each driving transistor DRT in each sub-pixel, a deviation in intrinsic characteristics (threshold voltage, mobility, or the like) between the driving transistors DRT in the respective sub-pixels can occur. Accordingly, a luminance deviation between the sub-pixels can occur, which can be a factor in lowering image quality. Thus, it is needed to sense the intrinsic characteristics of the respective driving transistors DRT in order to compensate for the luminance deviation between the sub-pixels, for example, in order to compensate for a deviation in intrinsic characteristics between the driving transistors DRT. The sensing of the intrinsic characteristics of the driving transistor DRT can be referred to as sensing of driving transistor DRT, driving transistor sensing, or Smode (slow mode) sensing.

Accordingly, in the display panel of the present disclosure, each of the sub-pixels can further include a transistor (hereinafter, referred to as a sensing transistor SENT) that can be used for sensing of the driving transistor DRT.

Referring to FIG. 2 in detail, the sub-pixel SP can include the light emitting element 130', the driving transistor DRT, a switching transistor SWT, a storage capacitor Cstg, and the sensing transistor SENT.

The driving transistor DRT is a transistor for driving the light emitting element 130' by supplying a driving current to the light emitting element 130', and can have a first node (node N1) that is electrically connected to a first electrode (an anode or cathode) of the light emitting element 130', a second node (node N2) corresponding to a gate node, and a third node (node N3) that is electrically connected to a driving voltage line DVL. At this time, for example, the driving transistor DRT receives a high-potential power supply voltage EVDD from the driving voltage line DVL through the node N3, and the light emitting element 130' can be operated by a driving current flowing between the high-potential power supply voltage EVDD and a low-potential power supply voltage EVSS.

The switching transistor SWT is controlled by a scan signal SCAN that is applied to the gate node through a corresponding gate line GL, and can be electrically connected between the node N2 of the driving transistor DRT and the data line DL.

The storage capacitor Cstg is electrically connected between the node N1 and the node N2 of the driving transistor DRT, and can serve to maintain a constant voltage for one frame.

The sensing transistor SENT is controlled by a first sense signal SENSE, which is a kind of scan signal that is applied to the gate node through a corresponding gate line GL', and can be electrically connected between the node N1 of the driving transistor DRT and a reference voltage line RVL.

The display device according to an exemplary embodiment of the present disclosure can further include the analog-to-digital converter (ADC) that senses a voltage of the node N1 of the driving transistor DRT through the reference voltage line RVL, as a main component for sensing the intrinsic characteristics of the driving transistor DRT.

For example, the display device according to an exemplary embodiment of the present disclosure can further include a switch S1 or S2 for connecting a node Nrvl to which the reference voltage line RVL is connected to a node Nadc which is connected to the analog-to-digital converter ADC or a supply node Nref of a reference voltage Vref, but the present disclosure is not limited thereto.

As described above, for example, in a sub-pixel structure including the sensing transistor SENT that is electrically connected to the reference voltage line RVL, the switching operations of the switches S1 and S2 are controlled so that the voltage of the node N1 of the driving transistor DRT includes elements for intrinsic characteristics of the driving transistor DRT. Then, the analog-to-digital converter ADC senses the voltage of the node N1 of the driving transistor DRT through the reference voltage line RVL and thus, can sense intrinsic characteristics of the driving transistor DRT. However, the present disclosure is not limited to a sensing method described above.

Meanwhile, as a narrow bezel is implemented, a distance between the lines is reduced, and in particular, a distance between lines in a link unit is more reduced. In this situation, for example, when a plurality of data lines such as first link lines, are disposed on both sides of the driving voltage line such as a second link line, the second link line has an increase in parasitic capacitance with the first link line adjacent thereto. Accordingly, there can occur a phenomenon in which a Smode sensing (driving transistor sensing) value of the first link line adjacent to the second link line is lowered by 7 or greater compared to the other first link lines.

Therefore, the present disclosure can reduce a parasitic capacitance between the first link line and the second link line and reduce differences in parasitic capacitance in the respective sub-pixels, by disposing the second link line on a layer different from that of the first link line and changing the second link line to have a whole electrode structure or entirely integrated electrode structure, rather than having a linear shape.

As a result, according to the present disclosure, it is possible to reduce imbalance of driving transistor sensed values, which will be described below in detail with reference to the drawings.

Figure 3:
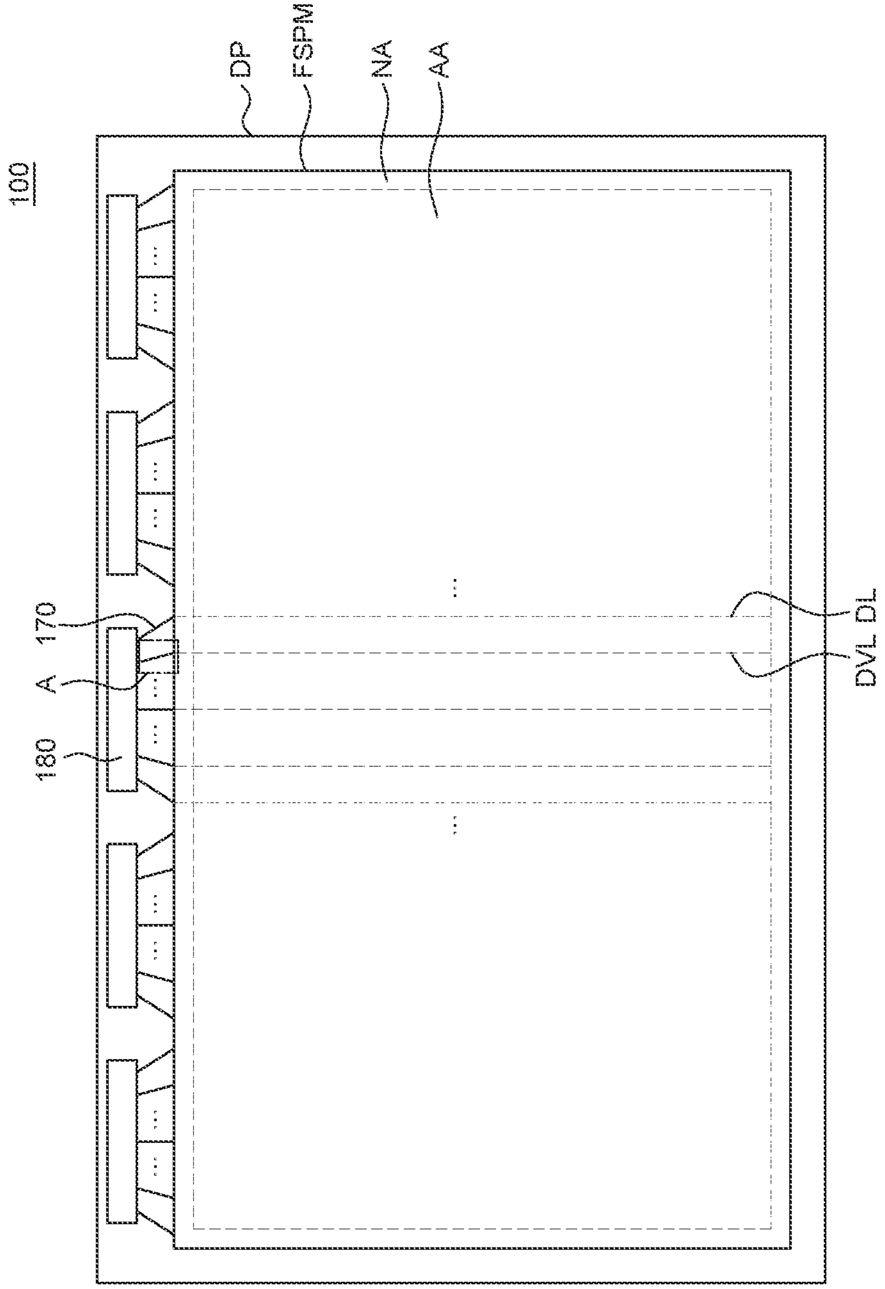
FIG. 3 is a schematic plan view of a display device according to an exemplary embodiment of the present disclosure.

FIG. 3 is a schematic plan view of a display device according to an exemplary embodiment of the present disclosure.

Referring to FIG. 3, a display device 100 according to an exemplary embodiment of the present disclosure can include the display panel DP, an encapsulation unit FSPM, and flexible films 180.

The display panel DP is a panel for displaying an image to a user. The display panel DP can include a display element for displaying an image, a driving element for driving the display element, and lines for transmitting various signals to the display element and the driving element. The display element can be defined differently depending on a type of display panel DP. For example, when the display panel DP is an organic light emitting display panel, the display element can be an organic light emitting element including an anode, an organic layer, and a cathode. For example, when the display panel DP is a liquid crystal display panel, the display element can be a liquid crystal display element.

Hereinafter, it is assumed that the display panel DP is an organic light emitting display panel, but the display panel DP of the present disclosure is not limited to the organic light emitting display panel.

The display panel DP can include an active area AA and a non-active area NA. The non-active area can surround completely or partially the active area AA. The active area AA is an area where an image is displayed on the display panel DP.

A plurality of sub-pixels constituting a plurality of pixels and circuits for driving the plurality of sub-pixels can be disposed in the active area AA. The plurality of sub-pixels are minimum units constituting the active area AA, and a display element can be disposed in each of the plurality of sub-pixels, and the plurality of sub-pixels can constitute pixels. For example, an organic light emitting element including an anode, an organic layer, and a cathode can be disposed in each of the plurality of sub-pixels, but the present disclosure is not limited thereto. The circuit for driving the plurality of sub-pixels can include driving elements and lines. For example, the circuit can include thin film transistors, a storage capacitor, gate lines, the data line DL, and the like, but the present disclosure is not limited thereto.

For example, in the active area AA, power lines for supplying a high-potential power supply voltage, a reference voltage, and a low-potential power supply voltage to the sub-pixels, for example, the driving voltage line DVL, a reference voltage line, and a ground line, can be disposed.

The sub-pixels can be operated by being connected to the gate lines, the data lines DL, and the sensing lines, respectively.

The non-active area NA is an area in which an image is not displayed.

Although FIG. 3 illustrates that the non-active area NA surrounds the active area AA having a rectangular shape, shapes and arrangements of the active area AA and the non-active area NA are not limited to an example shown in FIG. 3, and other variations are possible.

For example, the active area AA and the non-active area NA can have shapes suitable for a design of an electronic device in which the display device 100 is mounted. For example, the active area AA can have, for example a pentagonal shape, a hexagonal shape, a circular shape, or an elliptical shape.

In the non-active area NA, various lines and circuits for driving the organic light emitting elements of the active area AA can be disposed. For example, in the non-active area NA, driver ICs such as a gate driver IC and a data driver IC, and link lines 170 for transmitting signals to the plurality of sub-pixels and circuits of the active area AA can be disposed, but the present disclosure is not limited thereto.

Further, for example, the display device 100 can include various additional elements for generating various signals or driving the pixels in the active area AA. For example, additional elements for driving the pixels can include an inverter circuit, a multiplexer, an electrostatic discharge (ESD) circuit, and the like. The display device 100 can also include additional elements related to functions other than pixel driving. For example, the display device 100 can further include additional elements that provide a touch sensing function, a user authentication function (e.g., fingerprint recognition), a multi-level pressure sensing function, a tactile feedback function, and the like. The aforementioned additional elements can be positioned in the non-active area NA and/or in an external circuit connected to a connection interface.

The flexible film 180 is a film in which various parts are disposed on a flexible base film. Specifically, the flexible film 180 can be a film for supplying signals to the plurality of sub-pixels and circuits of the active area AA, and can be electrically connected to the display panel DP. The flexible film 180 can be disposed on one end of the display panel DP to supply power voltages, data voltages, and the like to the plurality of sub-pixels and circuits of the active area AA. Although FIG. 3 illustrates a case in which five flexible films 180 are disposed, the present disclosure is not limited thereto, and the number of flexible films 180 can be variously changed according to design or need.

The driver ICs such as a gate driver IC and a data driver IC can be disposed on the flexible film 180. The driver IC is a component that processes data for displaying an image and a driving signal for processing the data. The driver IC can be disposed in a method such as a chip on glass (COG) method, a chip on film (COF) method, or a tape carrier package (TCP) method depending on a mounting method. In this regard, the display panel PD of FIG. 3 can include same elements or similar elements as the display panel PD of FIG. 1.

Further, for example, a printed circuit board can be disposed on one end of the flexible film 180 and connected to the flexible film 180. For example, the printed circuit board is a component that supplies signals to the driver IC. In addition, the printed circuit board can supply various signals such as driving signals and data signals to the driver IC. For example, a data driver for generating data signals can be mounted on the printed circuit board, and the generated data signals can be supplied to the sub-pixels and circuits of the display panel DP through the flexible film 180.

The encapsulation unit FSPM can be disposed on the display panel DP. The encapsulation unit FSPM can include a sealing member and a reinforcement substrate.

In the present disclosure, by introducing an encapsulation structure of a multilayer structure including a relatively thick reinforcement substrate, rigidity and heat dissipation effects can be sufficiently secured. However, the present disclosure is not limited thereto, and various encapsulation structures can be utilized.

Meanwhile, for example, the flexible film 180 can be attached to one end of the display panel DP to cover a source pad and the driver IC, and a power voltage, a data voltage, and the like can be transmitted to the plurality of sub-pixels and circuits of the active area AA through the link lines 170.

For example, the link lines 170 can include first link lines that are electrically connected to the data lines DL and second link lines that are electrically connected to the driving voltage lines DVL, but the present disclosure is not limited thereto.

For example, when the second link line is a line that transmits a high-potential power supply voltage, the second link line can be connected to a first short bar that is disposed in parallel in a horizontal direction, and can be connected to a second short bar through a plurality of driving voltage lines DVL in the active area AA. However, the present disclosure is not limited thereto. The driving voltage lines DVL can be disposed in parallel in a vertical direction. For example, the first short bar can be positioned at an upper end of the active area AA, and the second short bar can be positioned at a lower end of the active area AA, but the present disclosure is not limited thereto.

For example, the first link line can be disposed on a light blocking layer or a gate layer, but is not limited thereto.

Further, in the present disclosure, in at least a portion of the link unit, the second link line can be disposed on a layer different from that of the first link line, for example, on an anode layer. In addition, the second link line disposed on the anode layer can have a single whole electrode structure over a plurality of the first link lines, rather than having a linear shape similar to the first link line. A detailed description of an example of the second link line of the present disclosure will be described later with reference to FIG. 6 and FIGS. 7A and 7B.

Figure 4:
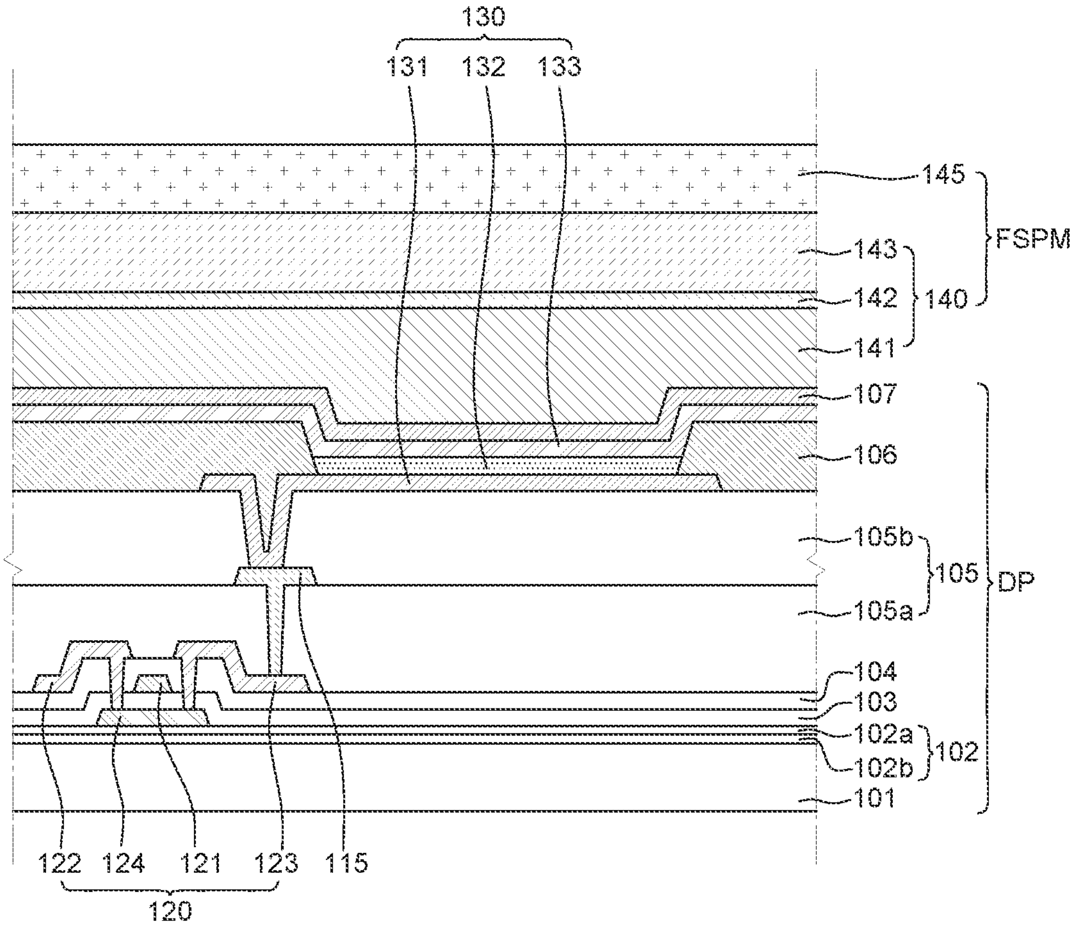
FIG. 4 is a cross-sectional view illustrating an example of a sub-pixel of the display device of FIG. 3.

Now FIG. 4 is a cross-sectional view illustrating an example of a sub-pixel of the display device of FIG. 3.

Referring to FIG. 4, a driving element 120 can be disposed on a substrate 101 of the display panel DP. For example, the driving element 120 can be a thin film transistor, but is not limited thereto. Further, a planarization layer 105 can be disposed on the driving element 120.

In addition, the light emitting element 130' that is electrically connected to the driving element 120 can be disposed on the planarization layer 105, and a capping layer 107 can be disposed on the light emitting element 130'. For example, the light emitting element 130' can be an organic light emitting element, but is not limited thereto.

A sealing member 140 and a reinforcement substrate 145 can be sequentially disposed on the capping layer 107. However, the reinforcement substrate 145 can be omitted. For example, the sealing member 140 and the reinforcement substrate 145 can constitute the encapsulation unit FSPM, but are not limited thereto.

The display device according to an exemplary embodiment of the present disclosure is not limited to such a multilayer structure.

Specifically, the substrate 101 can be a glass or plastic substrate. When the substrate 101 is a plastic substrate, a polyimide-based or polycarbonate-based material can be used to have flexibility. In particular, polyimide can be applied to a high-temperature process and is widely used as a plastic substrate because it is a material that can be coated.

A buffer layer 102 can be disposed on the substrate 101.

The buffer layer 102 is a layer for protecting various electrodes and lines from impurities such as alkali ions flowing out from the substrate 101 or lower layers thereof, and can have a multilayer structure including a first buffer layer **102*a* and a second buffer layer 102*b*. However, the present disclosure is not limited thereto. The buffer layer 102** can be formed of silicon oxide (SiOx) or silicon nitride (SiNx) or a multilayer thereof.

For example, the buffer layer 102 can delay diffusion of moisture and oxygen penetrating into the substrate 101. The buffer layer 102 can include a multi-buffer and/or an active buffer. The active buffer protects an active layer 124 formed of a semiconductor of the driving element 120 and can perform a function of blocking various types of impurities introduced from the substrate 101. The active buffer can be formed of amorphous silicon (a-Si) or the like.

For example, the driving element 120 can include the active layer 124, a gate electrode 121, a source electrode 122, and a drain electrode 123, and can be electrically connected to the light emitting element 130' through a connection electrode 115 to transmit a current or signal to the light emitting element 130'. The source and drain electrodes can be switched depending on the configuration of the driving element 120 such as a transistor.

The active layer 124 can be disposed on the buffer layer 102. The active layer 124 can be formed of polysilicon (p-Si), and in this case, a predetermined region thereof can be doped with impurities. In addition, the active layer 124 can be formed of amorphous silicon (a-Si) or can be formed of various organic semiconductor materials such as pentacene, and the like. Further, the active layer 124 can be formed of an oxide semiconductor.

A gate insulating layer 103 can be disposed on the active layer 124. The gate insulating layer 103 can be formed of an insulating inorganic material such as silicon oxide (SiOx) or silicon nitride (SiNx), and in addition to this, it can be formed of an insulating organic material or the like.

The gate electrode 121 can be disposed on the gate insulating layer 103. The gate electrode 121 can be formed of various conductive materials such as nickel (Ni), chromium (Cr), magnesium (Mg), aluminum (Al), molybdenum (Mo), tungsten (W), gold (Au), or an alloy thereof.

An interlayer insulating layer 104 can be disposed on the gate electrode 121. The interlayer insulating layer 104 can be formed of an insulating material such as silicon oxide (SiOx) or silicon nitride (SiNx), and in addition to this, it can be formed of an insulating organic material or the like.

By selectively removing the gate insulating layer 103 and the interlayer insulating layer 104, contact holes for exposing a source region and a drain region of the active layer 124 can be formed. For example, the source electrode 122 and the drain electrode 123 can be formed as a single-layer or multilayer structure of an electrode material on the interlayer insulating layer 104 and connected to the source region and the drain region, respectively.

If necessary, an additional passivation layer formed of an inorganic insulating material can be formed to cover the source electrode 122 and the drain electrode 123.

The planarization layer 105 can be disposed on the driving element 120 configured as described above.

The planarization layer 105 can have a multilayer structure including at least two layers, and can include, for example, a first planarization layer 105*a* and a second planarization layer 105*b*. The first planarization layer 105*a* can be disposed to cover the driving element 120 while exposing portions of the source electrode 122 and the drain electrode 123 of the driving element 120.

At least one layer of the planarization layer 105 can be formed of an organic material having a low dielectric constant and can have a thickness of 1 μm or more, but the present disclosure is not limited thereto.

The planarization layer 105 can be an overcoat layer, but is not limited thereto.

The connection electrode 115 for electrically connecting the driving element 120 and the light emitting element 130' can be disposed on the first planarization layer 105*a*. In addition, various metal layers serving as lines/electrodes such as data lines or signal lines can be disposed on the first planarization layer 105*a*.

The second planarization layer 105*b* can be disposed on the first planarization layer 105*a* and the connection electrode 115.

For example, in the display panel DP according to an exemplary embodiment of the present disclosure, the planarization layer 105 is formed of two layers due to an increase of various signal lines as the display panel DP has a higher resolution. Therefore, an additional layer is provided since it can be difficult to place all lines on one layer while securing a minimum distance therebetween. Due to the addition of such an additional layer, for example, the second planarization layer 105*b*, a margin is created in line arrangement, and line/electrode arrangement design can be facilitated. In addition, when a dielectric material is used for the planarization layer 105 formed of multiple layers, the planarization layer 105 can also be used for forming capacitance between metal layers.

For example, the second planarization layer 105*b* can be formed to expose a portion of the connection electrode 115, and the drain electrode 123 of the driving element 120 and an anode 131' of the light emitting element 130' can be electrically connected by the connection electrode 115.

The light emitting element 130' can include the anode 131', a plurality of organic layers 132', and a cathode 133. For example, the light emitting element 130' can include the anode 131' disposed on the planarization layer 105, the organic layer 132' disposed on the anode 131', and the cathode 133 disposed on the organic layer 132'.

For example, the display device can be implemented in a top emission method or bottom emission method according to an emission direction. In the case of the top emission method, a reflective layer formed of an opaque conductive material having high reflectivity, such as silver (Ag), aluminum (Al), gold (Au), molybdenum (Mo), tungsten (W), chromium (Cr), or an alloy thereof, can be added under the anode 131' such that light emitted from the organic layer 132' is reflected by the anode 131' and directed upward, for example, in a direction of the cathode 133 located thereabove. On the other hand, in the case of the bottom emission method, the anode 131' can be formed of only a transparent conductive material such as indium tin oxide (ITO), indium zinc oxide (IZO), or indium gallium zinc oxide (IGZO).

A bank 106 can be disposed on the planarization layer 105 in an area other than an emission area/portion. The bank 106 can have a bank hole exposing the anode 131' corresponding to the emission area. The bank 106 can be formed of an inorganic insulating material such as silicon nitride (SiNx) or silicon oxide (SiOx) or an organic insulating material such as BCB, acrylic resin, or imide resin.

The bank 106 can have a thickness of about 1 μm, but is not limited thereto.

The organic layer 132' can be disposed on the anode 131' exposed by the bank 106. The organic layer 132' can include an emission layer, an electron injection layer, an electron transport layer, a hole transport layer, a hole injection layer, and the like.

The cathode 133 can be disposed on the organic layer 132'.

In the case of the top emission method, the cathode 133 can include a transparent conductive material. For example, the cathode 133 can be formed of indium tin oxide (ITO), indium zinc oxide (IZO), or indium gallium zinc oxide (IGZO). In the case of the bottom emission method, the cathode 133 can include any one of the group including metal materials such as gold (Au), silver (Ag), aluminum (Al), molybdenum (Mo), magnesium (Mg), palladium (Pd), and copper (Cu), or alloys thereof. Alternatively, the cathode 133 can be configured by stacking a layer formed of a transparent conductive material such as indium tin oxide (ITO), indium zinc oxide (IZO), or indium gallium zinc oxide (IGZO), or a layer formed of a metal material such as gold (Au), silver (Ag), aluminum (Al), molybdenum (Mo), magnesium (Mg), palladium (Pd), or copper (Cu), or alloys thereof, but the present disclosure is not limited thereto.

The capping layer 107 formed of a material having a high refractive index and high light absorption can be disposed on the light emitting element 130' to reduce a diffused reflection of external light.

The capping layer 107 can be an organic material layer of an organic material and can be omitted if necessary.

An encapsulation structure (encapsulation unit FSPM) of a multilayer structure including the encapsulation member 140 and the reinforcement substrate 145 can be disposed over the cathode 133, but is not limited thereto. In a variation, the reinforcement substrate 145 can be eliminated or omitted.

Small-sized display panels used in mobile and portable devices have small areas, so heat can quickly dissipate from elements and there can be a few limitations with adhesion, whereas large-sized display panels used in monitors, tablets, and television receivers have large areas and thus, an encapsulation structure for optimal heat dissipation and adhesion is needed.

In addition, in order to secure insufficient rigidity, an electroluminescent display device can further include a separate inner plate on an upper portion of an encapsulation substrate. In this case, it is needed to secure a space for arranging the separate inner plate, and there can be limitations in slimming and lightening of the electroluminescent display device due to a weight of the inner plate. In addition, a vertical separation space is generated by an air gap generated between the encapsulation substrate and the inner plate by the amount equal to a thickness of an adhesive tape disposed to bond the encapsulation substrate and the inner plate, which can cause a limit in reducing heat dissipation performance.

Therefore, in the present disclosure, it is possible to apply an encapsulation structure of a multilayer structure including the sealing member 140 capable of preventing process defects and the fixing the reinforcement substrate 145 having a relatively large thickness, while removing the separate inner plate.

The sealing member 140 according to the present disclosure can include a first adhesive layer 141 facing the substrate 101, a second adhesive layer 143 facing the reinforcement substrate 145, and a barrier layer 142 disposed between the first adhesive layer 141 and the second adhesive layer 143, but is not limited thereto.

Each of the first adhesive layer 141 and the second adhesive layer 143 can be formed of an adhesive polymer material. For example, the first adhesive layer 141 can be formed of any one of olefin-based, epoxy-based, and acrylate-based polymer materials. In addition, the second adhesive layer 143 can be formed of any one of olefin-based, epoxy-based, acrylate-based, amine-based, phenol-based, and acid anhydride-based polymer materials that do not contain a carboxyl group. For example, the second adhesive layer 143 can be formed of a polymer material that does not contain a carboxyl group for film uniformity and corrosion prevention of the barrier layer 142.

To dissipate heat from the substrate 101, at least the first adhesive layer 141 among the first and second adhesive layers 141 and 143 can be formed of a mixture including particles of a metal material and an adhesive polymer material. For example, the particle of the metal material can be powder formed of nickel (Ni). The first adhesive layer 141 in contact with the substrate 101 (e.g., see FIG. 3 in the non-active area NA) is formed of a mixture including particles of a metal material and an adhesive polymer material, and thus can have higher thermal conductivity than that of the adhesive polymer material.

Similarly, the second adhesive layer 143 can be formed of a mixture including particles of a metal material and an adhesive polymer material and thus, have a higher thermal conductivity than that of the adhesive polymer material.

In this manner, since a speed at which driving heat generated in the substrate 101 is dissipated through the sealing member 140 can be improved, a heat dissipation effect of the substrate 101 can be improved.

In addition, to prevent moisture permeation to the active area AA, the first adhesive layer 141 can be formed of a mixture that further includes an inorganic filler having moisture absorbing properties. In this case, the inorganic filler having moisture absorbing properties can be at least one of barium oxide (BaO), calcium oxide (CaO), and magnesium oxide (MgO).

The second adhesive layer 143 may not include an inorganic filler for preventing moisture permeation. Accordingly, the second adhesive layer 143 can include only particles of a metal material and an adhesive polymer material. By doing so, the amount of relatively expensive inorganic filler having moisture absorbing properties, which is being used and injected into the sealing member 140, can be reduced, and thus a cost of preparing the sealing member 140 can be reduced.

In addition, since a mixing ratio of the polymer material included in the second adhesive layer 143 can be increased compared to that of the first adhesive layer 141 as long as the inorganic filler having moisture absorbing properties is not included, adhesion of the second adhesive layer 143 can be improved as compared to that of the first adhesive layer 141. Accordingly, as the reinforcement substrate 145 is more firmly fixed onto the second adhesive layer 143, reliability of adhesion between the substrate 101 and the reinforcement substrate 145 can be further improved.

In addition, as the multilayer structure of the first adhesive layer 141 and the second adhesive layer 142 is formed, a warpage phenomenon in which the display panel DP is bent can be reduced, and thus reliability can also be improved.

A thickness of each of the first and second adhesive layers 141 and 143 can be limited to a relevant thickness or less at which process defects/issues are prevented. In addition, a sum of the thicknesses of the first and second adhesive layers 141 and 143 can be limited to a relevant thickness or more at which reliability of fixing the reinforcement substrate 145 is secured.

The barrier layer 142 can be formed of a metal material. For example, the barrier layer 142 can be formed of a metal material such as aluminum (Al), copper (Cu), tin (Sn), silver (Ag), iron (Fe), and zinc (Zn).

The barrier layer 142 can be introduced to realize a laminated structure for reinforcing adhesion with the first and second adhesive layers 141 and 143 and reducing warpage.

For example, each of the first and second adhesive layers 141 and 143 includes an adhesive polymer material. Accordingly, the barrier layer 142 having a relatively hard material is disposed between the first adhesive layer 141 and the second adhesive layer 143 and thus, one side and the other side of the barrier layer 142 are bonded to the first adhesive layer 141 and the second adhesive layer 143, respectively, so that bonding strength can be improved.

Since the sealing member 140 according to the exemplary embodiment of the present disclosure includes the first and second adhesive layers 141 and 143 separated by the barrier layer 142, it can be implemented with a thickness twice as thick as a single-layer adhesive material without a process defect. Accordingly, since the reinforcement substrate 145 fixed by the sealing member 140 can be provided with a thicker thickness, there is an advantage in that rigidity increase and heat dissipation effects can be easily realized.

For example, the reinforcement substrate 145 can be formed of any one of glass and plastic polymer such as PET.

Meanwhile, embodiments of the present disclosure can be applied to both the top emission method and the bottom emission method. Hereinafter, examples of a stacked structure of a top emission element and a stacked structure of a bottom emission element, as a light emitting element 130, 130_B of a display device, will now be described below in detail with reference to drawings, respectively.

Figure 5A:
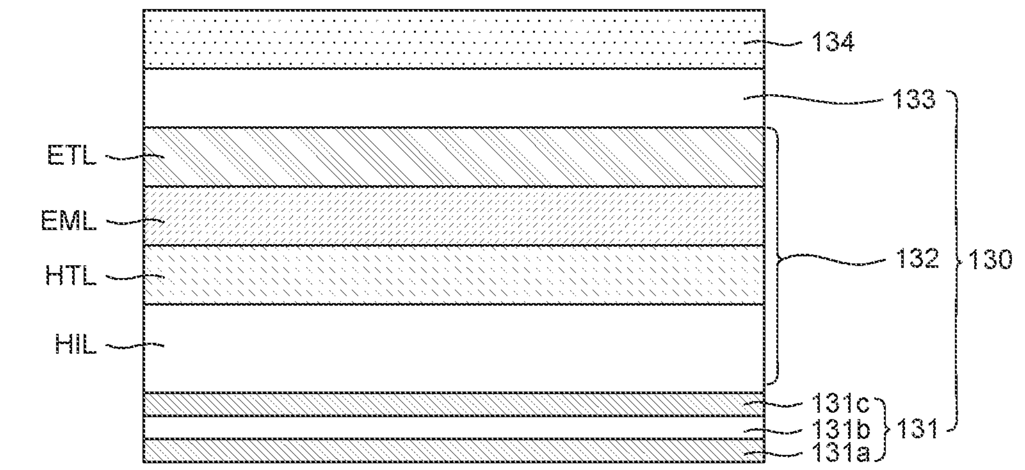
FIG. 5A is a view illustrating an example of a stacked structure of a top emission element by way of example.

FIG. 5A is a view illustrating an example of a stacked structure of a top emission element which can be used in a display panel.

Figure 5B:
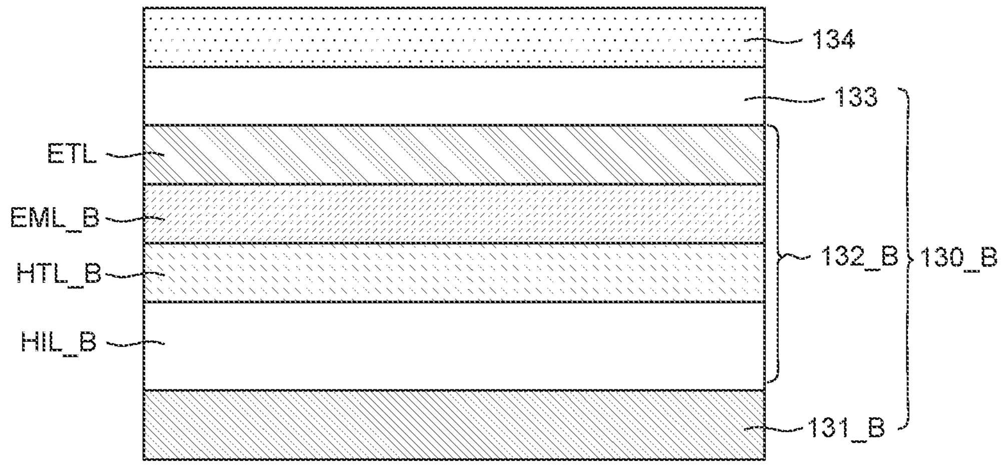
FIG. 5B is a view illustrating an example of a stacked structure of a bottom emission element.

FIG. 5B is a view illustrating an example of a stacked structure of a bottom emission element which can be used in a display panel.

Hereinafter, a configuration of a sub-pixel for top emission will be referred to as a first configuration, and a configuration of a sub-pixel for bottom emission will be referred to as a second configuration.

Referring to FIG. 5A illustrating the top emission element, a first light emitting element 130 can include, for example, a first anode 131, a first emission unit 132, and a cathode 133. The first anode 131 can be disposed on the second planarization layer 150*b*.

Further, the first anode 131 of the sub-pixel for top emission can include a reflective layer 131*b* so that emitted light is reflected by the first anode 131 and can be more smoothly emitted in a direction of an upper portion thereof where the cathode 133 is disposed.

For example, the first anode 131 can have a two-layer structure in which a transparent conductive layer formed of a transparent conductive material and a reflective layer are sequentially stacked, or can have a three-layer structure in which a transparent conductive layer 131*a*, the reflective layer 131*b*, and a transparent conductive layer 131*c* are sequentially stacked. The three-layer structure can include, for example, ITO/Ag/ITO.

The first emission unit 132 can be disposed on the first anode 131.

The first emission unit 132 serves to emit light, and can include at least one layer of a hole injection layer, a hole transport layer, an emission layer, an electron transport layer, and an electron injection layer, and some of the components can be omitted depending on a structure or characteristics of the panel.

In one example, a first hole injection layer HIL can be disposed on the first anode 131. A first hole transport layer HTL can be disposed on the first hole injection layer HIL. A first emission layer EML can be disposed on the first hole transport layer HTL. A first emission transport layer ETL can be disposed on the first emission layer EML.

The first emission layer EML can emit light of a specific color by including a material capable of emitting light of a specific color. In addition, the material capable of emitting light can be formed using a phosphorescent material or a fluorescent material.

The first emission layer EML can be any one of a red emission layer, a green emission layer, and a blue emission layer. For example, in the case of a red sub-pixel, the first emission layer EML can be a red emission layer, in the case of a green sub-pixel, the first emission layer EML can be a green emission layer, and in the case of a blue sub-pixel, the first emission layer EML can be a blue emission layer.

Further, an electron injection layer can be disposed on the electron transport layer ETL.

In addition, the cathode 133 and a capping layer 134 can be disposed on the electron transport layer ETL or the top layer of the first emission unit 132.

In another example, referring to FIG. 5B illustrating the bottom emission element, a second light emitting element 130_B can include, for example, a second anode 131_B, a second emission unit 132_B, and a cathode 133.

The second anode 131_B can be disposed on the second planarization layer 150*b*.

The second anode 131_B of the sub-pixel for bottom emission can be formed of a transparent conductive material such as indium tin oxide (ITO) or indium zinc oxide (IZO), but is not limited thereto.

The second emission unit 132_B can be disposed on the second anode 131_B. As described above, the second emission unit 132_B serves to emit light, and can include at least one layer of a hole injection layer, a hole transport layer, an emission layer, an electron transport layer, and an electron injection layer, and some of the components can be omitted depending on a structure or characteristics of the panel.

In this example, a second hole injection layer HIL_B can be disposed on the second anode 131_B. A second hole transport layer HTL_B can be disposed on the second hole injection layer HIL_B. A second emission layer EML_B can be disposed on the second hole transport layer HTL_B. An electron transport layer ETL can be disposed on the second emission layer EML_B.

The second emission layer EML_B can emit light of a specific color by including a material capable of emitting light of a specific color. In addition, the material capable of emitting light can be formed using a phosphorescent material or a fluorescent material.

The second emission layer EML_B can be any one of a red emission layer, a green emission layer, and a blue emission layer. For example, in the case of a red sub-pixel, the second emission layer EML_B can be a red emission layer, in the case of a green sub-pixel, the second emission layer EML_B can be a green emission layer, and in the case of a blue sub-pixel, the second emission layer EML_B can be a blue emission layer.

Further, the electron injection layer can be further disposed on the electron transport layer ETL.

In addition, the cathode 133 and the capping layer 134 can be disposed on the electron transport layer ETL or the top layer of the second emission unit 132_B.

Further, embodiments of the present disclosure are not limited to an emission element structure employing one stack, for example, one emission unit, and can also be applied to an emission element structure of a tandem configuration including a plurality of emission units to implement improved efficiency and lifespan characteristics.

Figure 6:
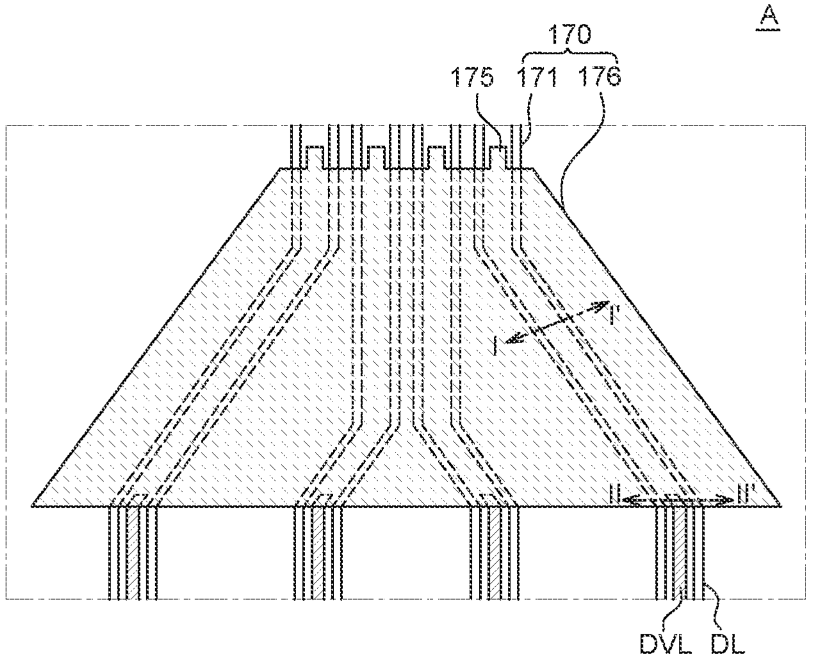
FIG. 6 is an enlarged view of portion A of FIG. 3 according to an example of the present disclosure.

FIG. 6 is an enlarged view of portion A of FIG. 3 and shows one example of an enlarged portion of a link unit in the non-active area NA of the display device.

Figure 7A:
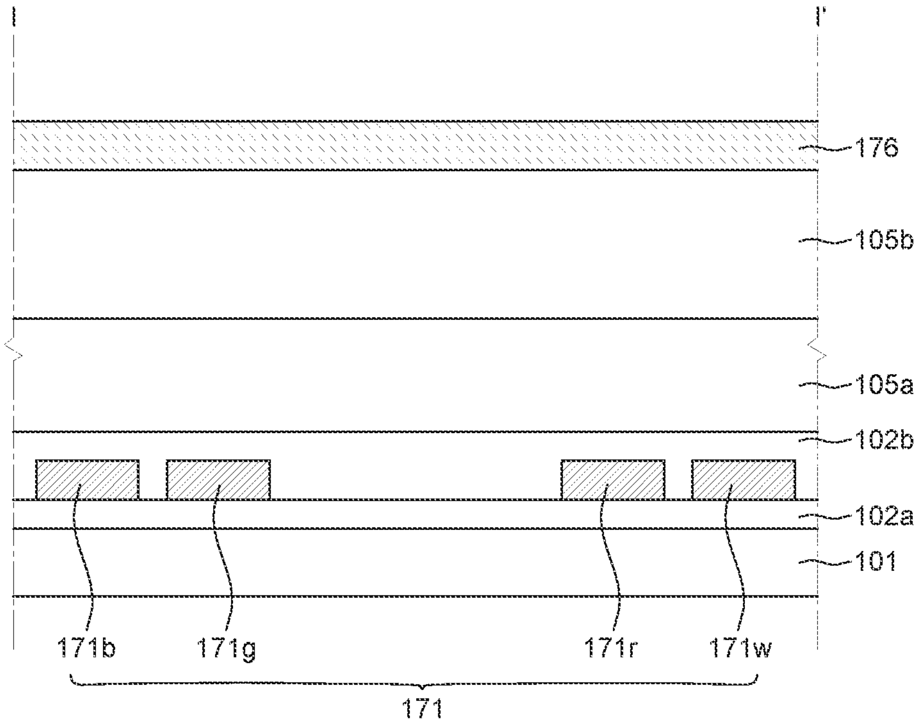
FIG. 7A is a view illustrating a cross-section taken along line I-I' of FIG. 6.
Figure 7B:
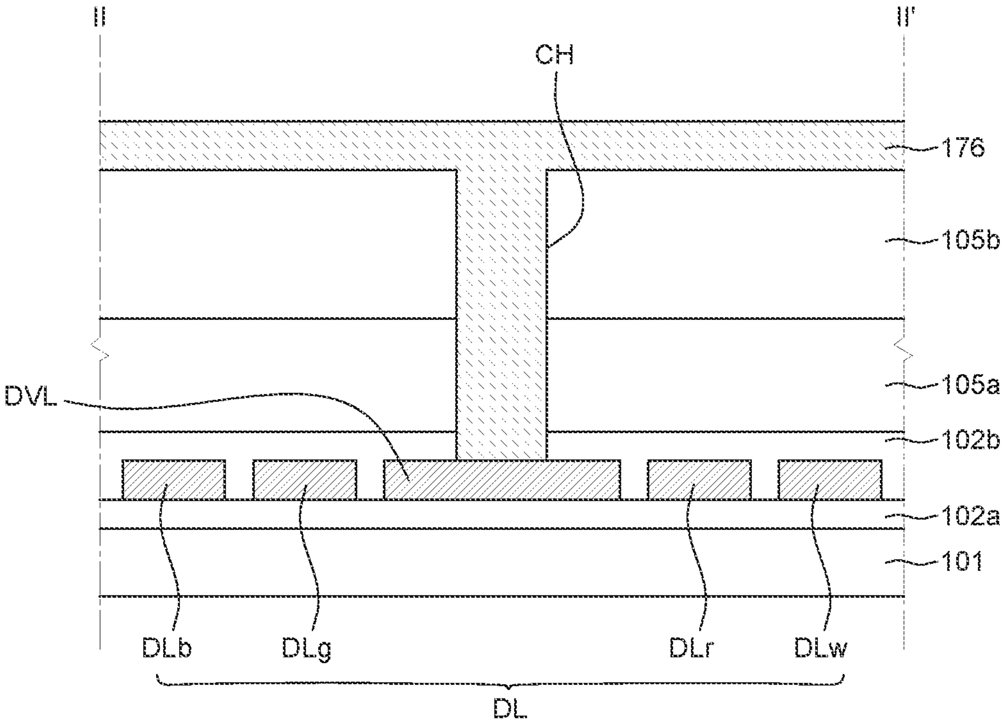
FIG. 7B is a view illustrating a cross-section taken along line II-II' of FIG. 6.

FIG. 7A is a view illustrating a cross-section taken along line I-I' of FIG. 6. FIG. 7B is a view illustrating a cross-section taken along line II-II' of FIG. 6.

Referring to FIG. 6 and FIGS. 7A, and 7B, a plurality of the link lines 170 for transmitting signals to the plurality of sub-pixels and circuits in the active area can be disposed in a link unit. That is, a link unit can be composed of the link lines 170.

The link lines 170 can include for example, a plurality of first link lines 171 that extend from the respective data lines DL, and second link lines 176 that are electrically connected to the plurality of driving voltage lines DVL, but the present disclosure is not limited thereto.

For example, the plurality of first link lines 171 extending from the plurality of data lines DL can be disposed in a partial region of the link unit. For example, among the plurality of first link lines 171, a blue first link line 171*b* connected to a data line DLb of a blue sub-pixel, a green first link line 171*g* connected to a data line DLg of a green sub-pixel, a red first link line 171*r* connected to a data line DLr of a red sub-pixel, and a white first link line 171*w* connected to a data line DLw of a white sub-pixel are sequentially arranged, and such arrangement can be repeated, but the present disclosure is not limited thereto.

Here, the blue first link line 171*b* can be a first-first link line, the green first link line 171*g* can be a first-second link line, the red first link line 171*r* can be a first-third link line, and the white first link line 171*w* can be a first-fourth link line.

The plurality of first link lines 171 (e.g., 171*b*, 171*g*, 171*r*, 171*w*) can be gathered at one place in an upper pad portion to which the flexible film 180 is attached and spread out in a radial shape toward the active area disposed downward, but the present disclosure is not limited thereto.

In another partial area of the link unit and the active area, two data lines DL are arranged on a left side and a right side of the driving voltage line DVL, and such arrangement can be repeated, but the present disclosure is not limited thereto.

For example, the data line DLb of the blue sub-pixel, the data line DLg of the green sub-pixel, the driving voltage line DVL, the data line DLr of the red sub-pixel, and the data line DLw of the white sub-pixel are sequentially arranged as shown in FIG. 7B, and such arrangement can be repeated, but the present disclosure is not limited thereto.

For example, the first link lines 171, the data lines DL, and the driving voltage lines DVL can be disposed on a light blocking layer or a gate layer, but are not limited thereto.

The second link line 176 can be disposed on a layer different from that of the first link line 171, for example, on an anode layer (e.g., layer corresponding to the first anode 131, 131', 131_B), in at least a portion of the link unit.

In addition, the second link line 176 disposed on the anode layer can have a whole electrode structure over the plurality of first link lines 171, which is not in a linear shape similar to the first link line 171. For example, the second link line 176 can have a single whole electrode structure having a trapezoidal shape over the plurality of first link lines 171 in a radial shape.

For example, the plurality of first link lines 171 can constitute respective groups, and one second link line 176 can be disposed corresponding to each of such groups, but the present disclosure is not limited thereto.

At this time, FIGS. 6 and 7A illustrate, for example, a case where the blue first link line 171*b*, the green first link line 171*g*, the red first link line 171*r*, and the white first link line 171*w* of one group are repeatedly disposed four times, by way of example. However, the present disclosure is not limited thereto and obviously other variations are possible.

Referring to FIGS. 6 and 7A and 7B, for example, a first buffer layer 102*a* can be disposed on the substrate 101 in the non-active area of the display panel.

The first buffer layer 102*a* can be formed of silicon oxide (SiOx) or silicon nitride (SiNx) or multiple layers thereof, but is not limited thereto.

The first link lines 171, the data lines DL, and the driving voltage lines DVL can be disposed on the first buffer layer 102*a*.

The first link lines 171, the data lines DL, and the driving voltage lines DVL can be formed of various conductive materials, for example, nickel (Ni), chromium (Cr), magnesium (Mg), aluminum (Al), gold (Au), molybdenum (Mo), tungsten (W), copper (Cu), or alloys thereof.

As described above, in a partial region of the link unit, the blue first link line 171*b*, the green first link line 171*g*, the red first link line 171*r*, and the white first link line 171*w* are sequentially arranged, and such arrangement can be repeated, but the present disclosure is not limited thereto. For example, a distance between the green first link line 171*g* and the red first link line 171*r* can be wider or larger than a distance between the other first link lines 171 (e.g., between the green and blue first link lines 171*g* and 171*b*), but the present disclosure is not limited thereto. For example, the first link lines 171 can have the same distance therebetween in a partial area of the link unit. For example, the partial area of the link unit can be a majority area of the link unit, and can be an area in which the plurality of first link lines 171 spread out in a radial shape.

In addition, in another partial area of the link unit and the active area, the data line DLb of the blue sub-pixel, the data line DLg of the green sub-pixel, the driving voltage line DVL, the data line DLr of the red sub-pixel, and the data line DLw of the white sub-pixel can be sequentially disposed, and such arrangement can be repeated, but the present disclosure is not limited thereto. For example, another partial area of the link unit can be an area between the partial area of the link unit and the active area, or can be an area in which the second link line 176 is not disposed.

The second buffer layer 102*b* can be disposed on the first link lines 171, the data lines DL, and the driving voltage line DVL.

The second buffer layer 102*b* can be formed of silicon oxide (SiOx) or silicon nitride (SiNx) or multiple layers thereof, but is not limited thereto.

For example, the interlayer insulating layer (104 in FIG. 4), a passivation layer, and the planarization layer 105 can be disposed on the second buffer layer 102*b*. However, the present disclosure is not limited thereto, and the interlayer insulating layer 104 or the passivation layer between the second buffer layer 102*b* and the planarization layer 105 can be omitted. The first and second buffer layers 102*a* and 102*b* can constitute the buffer layer 102.

The planarization layer 105 can have a multilayer structure including at least two layers, and at least one layer of the planarization layer 105 can be formed of an organic material having a low dielectric constant. For example, the planarization layer 105 can include the first planarization layer 105*a* and the second planarization layer 105*b*.

For example, the second buffer layer 102*b*, the first planarization layer 105*a*, and the second planarization layer 105*b* can include contact holes CH exposing portions of the driving voltage lines DVL.

For example, the contact hole CH can expose a portion of an upper surface of one end portion of the driving voltage line DVL.

The second link line 176 can be disposed on the planarization layer 105 (e.g., 105*b* and 105*a*). The second link line 176 can be electrically connected to the plurality of driving voltage lines DVL through the contact holes CH.

For example, the second link line 176 can have a two-layer structure in which a transparent conductive layer formed of a transparent conductive material and a reflective layer are sequentially stacked, or a three-layer structure in which a transparent conductive layer, a reflective layer, and a transparent conductive layer are sequentially stacked. The reflective layer can be silver (Ag) or an alloy containing silver. In addition, the second link line 176 can be formed of only a transparent conductive material such as indium tin oxide (ITO), indium zinc oxide (IZO), or indium gallium zinc oxide (IGZO).

The second link line 176 can have a whole electrode structure (entire electrode structure) over the plurality of first link lines 171, which is not in a linear shape similar to the first link line 171. For example, the second link line 176 can have a single whole electrode structure having a trapezoidal shape over the plurality of first link lines 171 having a radial shape (e.g., radially spread out), when viewed from a plan view. Further, for example, the second link line 176 can be disposed over an entirety of the first link lines 171 in a manner in which it covers the entirety of the first link lines 171, in the form of a whole electrode, in a portion of a link area. In FIG. 6, the second link line 176 is shown to cover the entire first link lines 171 that are radially extending (e.g., extending in slant lines).

For example, as shown in FIG. 6, a plurality of contact portions 175 that are connected to the flexible films 180 can be disposed at an upper end of the second link line 176 having a trapezoidal shape, but the present disclosure is not limited thereto.

The plurality of contact portions 175 can be located between the first link lines 171, but are not limited thereto.

For example, as a narrow bezel is implemented, a distance between lines is reduced, especially in the link unit. In this situation, for example, when a plurality of first link lines are disposed on both sides of the second link line, the second link line has an increase in parasitic capacitance with the first link line adjacent to the second link line. Accordingly, a Smode sensing (driving transistor sensing) value of the first link line adjacent to the second link line can be lowered by 7 or more compared to the other first link lines. That is, Smode is used in external compensation to compensate for a variation in threshold voltage of the driving transistor, and for example, if a sensed value has a range of about 0 to 1023, a phenomenon in which the sensed value is lowered by 7 or more compared to a target value occurs. For example, when a distance between the first link line and the second link line is 6 μm, a parasitic capacitance between the first link line and the second link line is about 10 pF, and at this time, the sensed value has a numerical value which is lower than the target value by about 8. Therefore, an area where the second link line is disposed can exhibit consistently lower sensing values, approximately 8 units lower compared to the surrounding areas, which can result in vertical line defects. On the other hand, if the distance between the first link line and the second link line is increased to a level of 20 μm, the parasitic capacitance between the first link line and the second link line is about 3 pF, and at this time, the sensed value approaches the target value. Therefore, the vertical line defect of the sensed value does not occur in the display device of the present disclosure.

Accordingly, according to an exemplary embodiment of the present disclosure, the parasitic capacitance between the first link line 171 and the second link line 176 can be reduced by disposing the second link line 176 on the anode layer (e.g., anode of the light emitting element), which is a layer different from that of the first link line 171, and changing the second link line 176 to have a whole electrode structure (e.g., trapezoid shape) rather than having a linear shape. As a result, it is possible to reduce imbalance of sensed values of the driving transistors.

In addition, as the distances between the first link lines 171 and a plurality of the second link lines 176 increase, differences in parasitic capacitance for the respective subpixels also decrease. Accordingly, quality of the display panel can be improved, and the total resistance of the second link lines 176 can be reduced, so that the power consumption of the display panel can be reduced in the present disclosure.

In addition, according to an exemplary embodiment of the present disclosure, by disposing the second link line 176, which was previously disposed on a light blocking layer or a gate layer, on the anode layer, areas where the first link lines 171 are formed can be easily utilized.

In addition, according to an exemplary embodiment of the present disclosure, as a width of the second link line 176 increases, it is possible to effectively cope with heat generation.

Figure 8:
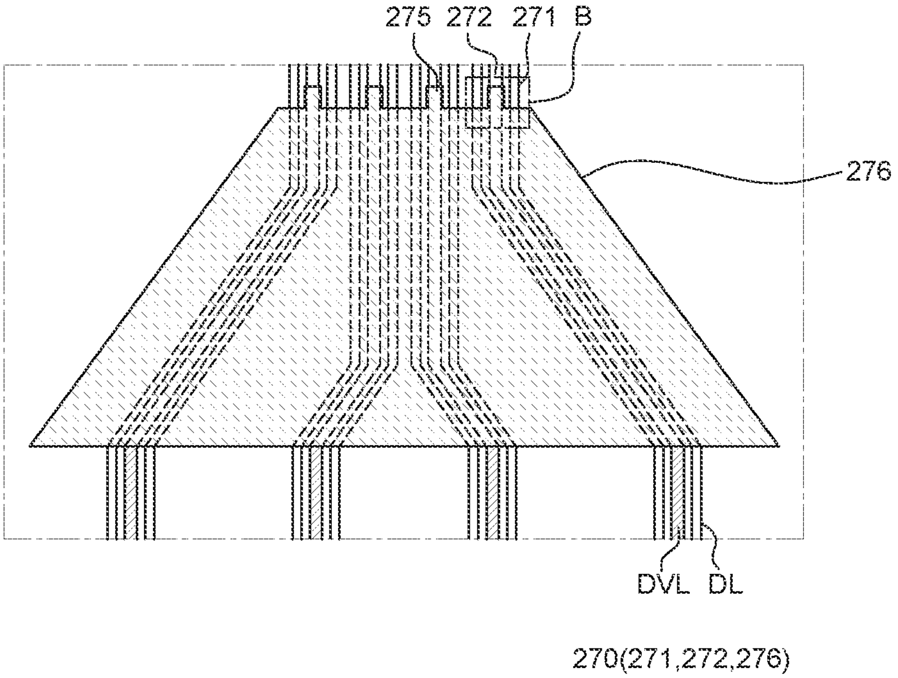
FIG. 8 is an enlarged view of portion A of FIG. 3 according to another example of the present disclosure.
Figure 9:
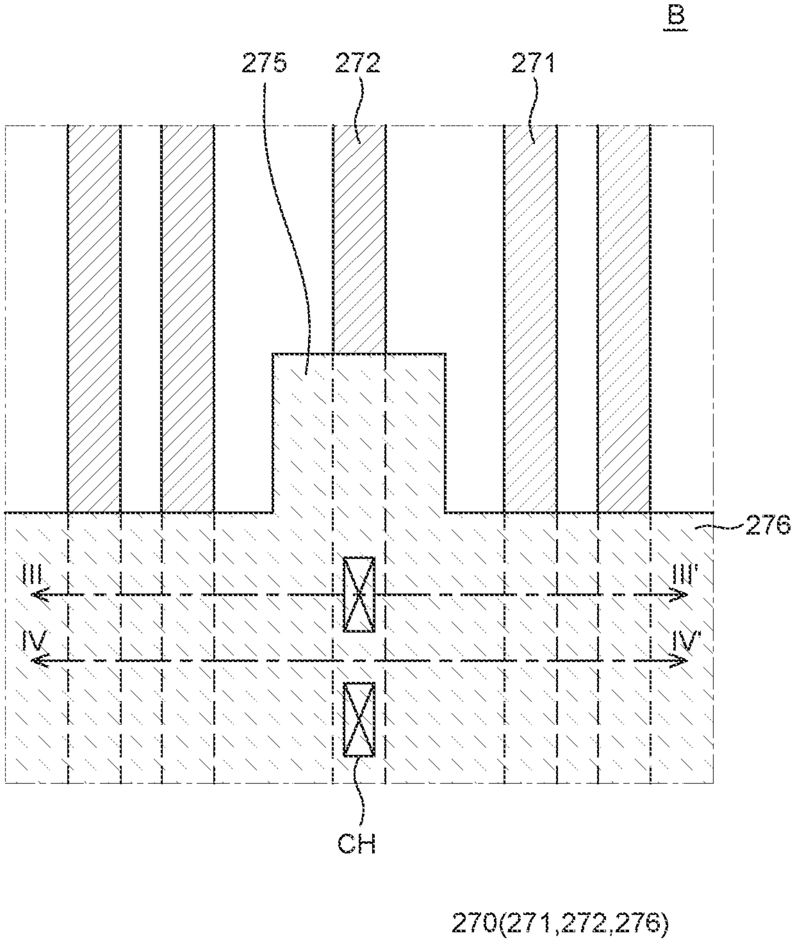
FIG. 9 is an enlarged view of part B of FIG. 8.

FIG. 8 is an enlarged plan view of a part of a display panel according to another exemplary embodiment of the present disclosure, and shows another example of an enlarged portion of a link unit in the non-active area NA of the display panel. FIG. 9 is an enlarged view of part B of FIG. 8.

Figure 10A:
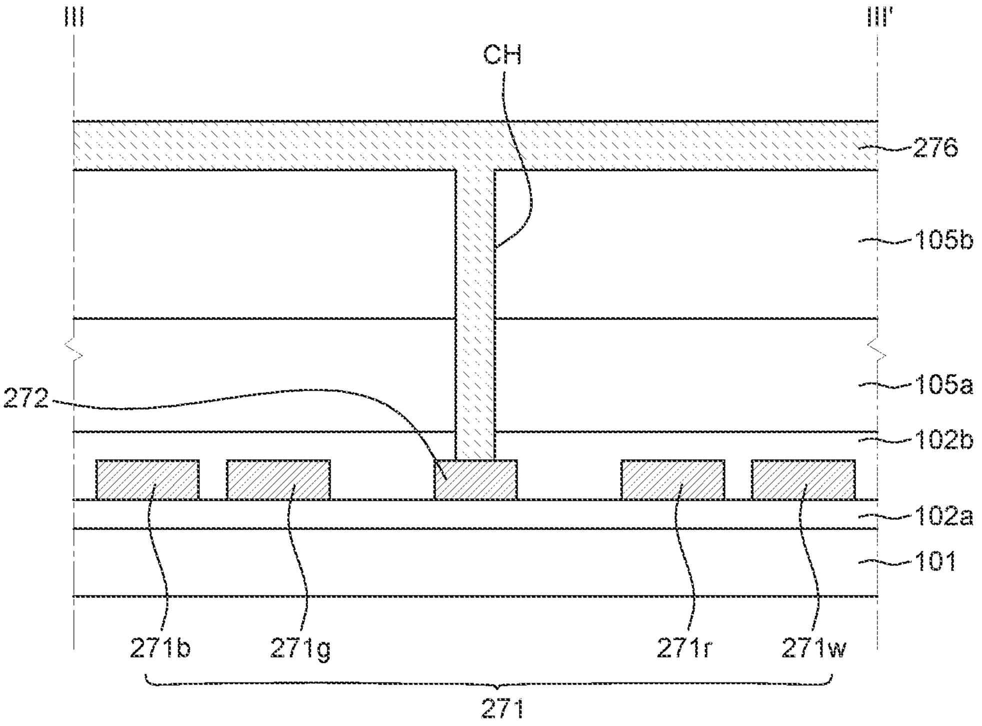
FIG. 10A is a view illustrating a cross-section taken along line III-III' of FIG. 9.
Figure 10B:
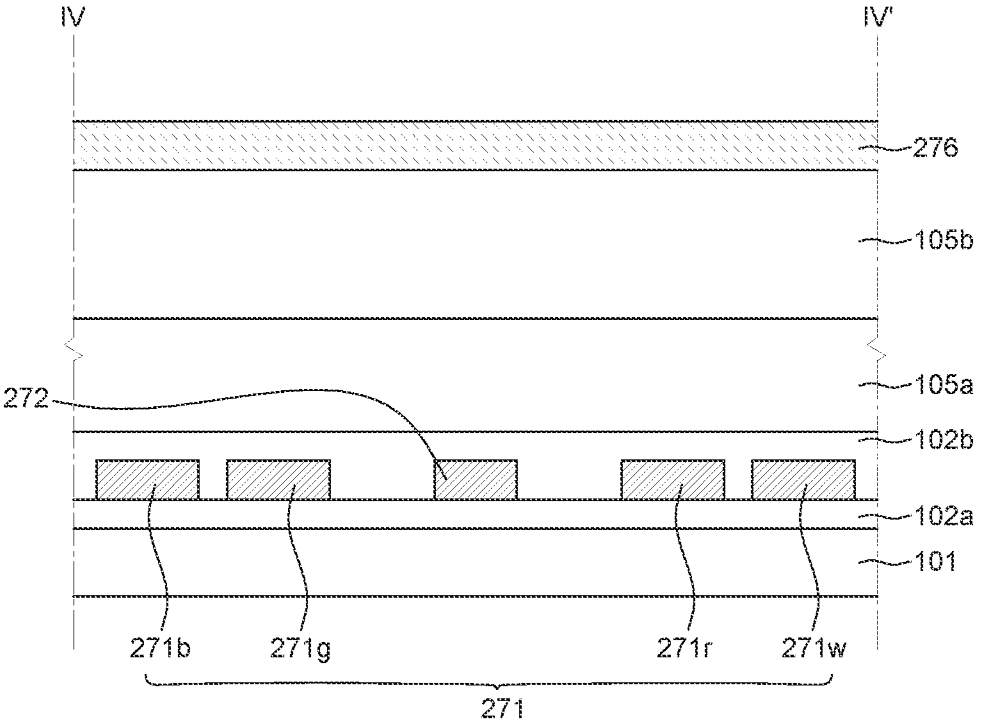
FIG. 10B is a view illustrating a cross-section taken along IV-IV' of FIG. 9.

FIG. 10A is a view illustrating a cross-section taken along line III-III' of FIG. 9. FIG. 10B is a view illustrating a cross-section taken along IV-IV' of FIG. 9.

Since the configurations of a display device according to this another exemplary embodiment of the present disclosure shown in FIGS. 8, 9, 10A and 10B are substantially identical to those of the display device according to the exemplary embodiment shown in FIGS. 6, 7A and 7B with some differences in link lines 270, duplicate descriptions of some of these elements will be omitted or may be briefly provided.

Referring to FIGS. 8 to 10B, a plurality of the link lines 270 for transmitting signals to the plurality of sub-pixels and circuits in the active area of the display panel can be disposed in a link unit. That is, a link unit can be composed of the link lines 270.

The link lines 270 can include, for example, a plurality of first link lines 271 that extend from the respective data lines DL and second link lines 276 that are electrically connected to the plurality of driving voltage lines DVL. In addition, the link lines 270 can further include auxiliary link lines 272, but the present disclosure is not limited thereto. In one link unit, one second link line 276 covers the plurality of first link lines 271 and auxiliary link lines 272.

For example, the plurality of first link lines 271 extending respectively from the plurality of data lines DL can be disposed in a partial region of the link unit. For example, among the plurality of first link lines 271, a blue first link line 271*b* connected to the data line of a blue sub-pixel, a green first link line 271*g* connected to the data line of a green sub-pixel, a red first link line 271*r* connected to the data line of a red sub-pixel, and a white first link line 271*w* connected to the data line of a white sub-pixel are sequentially arranged, and such arrangement can be repeated.

The plurality of first link lines 271 can be gathered at one place in an upper pad portion to which the flexible film (e.g., like the film 180) is attached and spread out in a radial shape toward the active area disposed downward, but the present disclosure is not limited thereto.

Meanwhile, the auxiliary link lines 272 can be disposed between the plurality of first link lines 271, but the present disclosure is not limited thereto. For example, the auxiliary link line 272 can be disposed between the green first link line 271*g* and the red first link line 271*r*, but is not limited thereto.

For example, since the auxiliary link lines 272 serve to assist the second link line 276, it can have a relatively narrow width compared to the plurality of first link lines 271.

The auxiliary link lines 272 can be respectively and electrically connected to the driving voltage lines DVL. For example, under the second link line 276, the auxiliary link lines 272 can have a width that is reduced by the amount of ½ or compared to the driving voltage line DVL, but the present disclosure is not limited thereto. The second link line 276 is electrically connected to the driving voltage lines DVL (e.g., similar to as shown in FIG. 7B).

In another partial area of the link unit and the active area, two data lines DL are disposed on the left side and the right side of the driving voltage line DVL, and such arrangement can be repeated, but the present disclosure is not limited thereto.

For example, the data line of the blue sub-pixel, the data line of the green sub-pixel, the driving voltage line DVL, the data line of the red sub-pixel, and the data line of the white sub-pixel are sequentially disposed, and such arrangement can be repeated. However, the present disclosure is not limited thereto.

For example, the first link lines 271, the auxiliary link lines 272, the data lines DL, and the driving voltage lines DVL can be disposed on a light blocking layer or a gate layer, but are not limited thereto.

The second link line 276 can be disposed on a layer different from that of the first link line 271 and the auxiliary link line 272, for example, on an anode layer (e.g., layer corresponding to the first anode such as 131, 131', 131_B), in at least a portion of the link unit.

In addition, the second link line 276 disposed on the anode layer can have a whole (entire) electrode structure over the plurality of first link lines 271 and the auxiliary link lines 272, rather than having a linear shape similar to the first link line 271. For example, the second link line 276 can have a single whole electrode structure having a trapezoidal shape over the plurality of first link lines 271 and the auxiliary link lines 272 which are in a radial shape. Further, for example, the second link line 276 can be disposed over an entirety of the first link lines 271 in a manner in which it covers the entirety of the first link lines 271, in the form of a whole (entire) electrode, in a portion of a link area.

For example, the plurality of first link lines 271 and the auxiliary link lines 272 can constitute respective groups, and one second link line 276 can be disposed corresponding to and covering each of such groups, but the present disclosure is not limited thereto.

At this time, in FIGS. 8 and 10A, for example, a case where the blue first link line 271*b*, the green first link line 271*g*, the red first link line 271*r*, and the auxiliary link line 272 of one group are repeatedly disposed four times, by way of example. However, the present disclosure is not limited thereto.

Referring to FIGS. 8 to 10B, the first buffer layer 102*a* can be disposed on the substrate 101 in the non-active area of the display panel.

The first link lines 271, the auxiliary link lines 272, the data lines DL, and the driving voltage lines DVL can be disposed on the first buffer layer 102*a*.

The first link lines 271, the auxiliary link lines 272, the data lines DL, and the driving voltage lines DVL can be formed of various conductive materials such as nickel (Ni), magnesium (Mg), aluminum (Al), gold (Au), molybdenum (Mo), tungsten (W), copper (Cu), chromium (Cr), or alloys thereof.

As described above, in a partial region of the link unit, the blue first link line 271*b*, the green first link line 271*g*, the auxiliary link line 272, the red first link line 271*r*, and the white first link line 271*w* are sequentially arranged, and such arrangement can be repeated, but the present disclosure is not limited thereto. For example, distances between the green first link line 271*g* and the auxiliary link line 272 and between the auxiliary link line 272 and the red first link line 271*r* can be wider or larger than distances between the other first link lines 271 (e.g., between the red and white first link lines 271*r* and 271*w*, or between the blue and green first link lines 271*b* and 271*g*), but the present disclosure is not limited thereto. For example, a partial area of the link unit can be a majority area of the link unit, and can be an area in which the plurality of first link lines 271 and auxiliary link lines 272 spread out in a radial shape (e.g., radially spread out or extending).

For example, since the auxiliary link line 272 serves to assist the second link line 276, it can have a relatively narrow width compared to the plurality of first link lines 271. In addition, since the width of the auxiliary link line 272 can be reduced compared to a conventional one, the distance between the auxiliary link line 272 and the first link lines 271 adjacent thereto can be increased to about 20 μm. Accordingly, a parasitic capacitance between the auxiliary link line 272 and the first link line 271 can be reduced by 3/10 or more compared to the conventional configuration.

For example, under the second link line 276, the auxiliary link line 272 can have a width that is reduced by the amount of ½ or greater compared to a width of the driving voltage line DVL, but the present disclosure is not limited thereto. For instance, a width of each auxiliary link line 272 can be narrower (e.g., about ½ or more of) than a width of each driving voltage line DVL.

In another partial area of the link unit and the active area, the data line of the blue sub-pixel, the data line of the green sub-pixel, the driving voltage line DVL, the data line of the red sub-pixel, and the data line of the white sub-pixel are sequentially arranged, and such arrangement can be repeated, but the present disclosure is not limited thereto. For example, another partial area of the link unit can be an area between the partial area of the link unit and the active area, or can be an area in which the second link line 276 is not disposed.

The second buffer layer 102*b* can be disposed on the first link lines 271, the auxiliary link lines 272, the data lines DL, and the driving voltage lines DVL.

The planarization layer 105 can be disposed on the second buffer layer 102*b*. However, the present disclosure is not limited thereto, and an interlayer insulating layer or an insulating layer of a passivation layer can be further disposed between the second buffer layer 102*b* and the planarization layer 105.

The planarization layer 105 can have a multilayer structure including at least two layers, and can include, for example, the first planarization layer 105*a* and the second planarization layer 105*b*.

For example, the second buffer layer 102*b*, the first planarization layer 105*a*, and the second planarization layer 105*b* can include contact holes CH exposing portions of the auxiliary link lines 272.

For example, the contact hole CH can expose a portion of an upper surface of the auxiliary link line 272, and a plurality of the contact holes CH can be disposed along the auxiliary link line 272.

The second link line 276 can be disposed on the planarization layer 105. The second link line 276 can be electrically connected to the plurality of auxiliary link lines 272 through the plurality of contact holes CH.

For example, the second link line 276 can have a two-layer structure in which a transparent conductive layer formed of a transparent conductive material and a reflective layer are sequentially stacked, or a three-layer structure in which a transparent conductive layer, a reflective layer, and a transparent conductive layer are sequentially stacked. The reflective layer can be silver (Ag) or an alloy containing silver. Also, the second link line 276 can be formed of only a transparent conductive material such as indium tin oxide (ITO), indium zinc oxide (IZO), or indium gallium zinc oxide (IGZO).

The second link line 276 can have a whole electrode structure over the plurality of first link lines 271 and the auxiliary link lines 272, which is not in a linear shape similar to the first link lines 271 and auxiliary link lines 272. For example, the second link line 276 can have a single whole electrode structure having a trapezoidal shape over the plurality of first link lines 271 and the auxiliary link lines 272 which are in a radial shape, when viewed from a plan view.

In addition, as shown in FIGS. 8 and 9, a plurality of contact portions 275 that are connected to the flexible films (e.g., like the film 180) can be disposed at an upper end of the second link line 276 having a trapezoidal shape, but the present disclosure is not limited thereto.

The plurality of contact portions 275 can be positioned above the auxiliary link lines 272 between the first link lines 271, but the present disclosure is not limited thereto.

The exemplary embodiments of the present disclosure can also be described as follows:

According to an aspect of the present disclosure, there is provided a display device. The display device comprises a display panel including an active area and a non-active area, a plurality of data lines and driving voltage lines disposed in the active area, a plurality of first link lines disposed in the non-active area and connected to the plurality of data lines, respectively and one second link line disposed over the plurality of first link lines and connected to a part of the plurality of driving voltage lines.

The plurality of first link lines can include a first-first link line connected to the data line of a first sub-pixel, a first-second link line connected to the data line of a second sub-pixel, a first-third link line connected to the data line of a third sub-pixel, and a first-fourth link line connected to the data line of a fourth sub-pixel.

The first sub-pixel can be a blue sub-pixel, the second sub-pixel can be a green sub-pixel, the third sub-pixel can be a red sub-pixel, and the fourth sub-pixel can be a white sub-pixel.

In a portion of the non-active area, the first-first link line, the first-second link line, the first-third link line, and the first-fourth link line can be sequentially disposed in a repeated manner.

A distance between the first-second link line and the first-third link line can be wider than a distance between the other first link lines.

The plurality of first link lines can extend from one side toward the active area in a radial shape.

In a portion of the non-active area, the second link line can be disposed over an entirety of the plurality of first link lines in a manner in which it covers the entirety of the plurality of first link lines, in a form of a whole electrode.

In another portion of the non-active area, the data line of the first sub-pixel, the data line of the second sub-pixel, the driving voltage line, the data line of the third sub-pixel, and the data line of the fourth sub-pixel can be sequentially disposed in a repeated manner.

The second link line may not be disposed in another portion of the non-active area.

The first link lines, the data lines, and the driving voltage lines can be disposed on a first layer.

The second link line can be disposed on a second layer above the first layer in a portion of the non-active area.

At least one insulating layer can be interposed between the first layer and the second layer.

The second link line can have a whole electrode structure over a portion of the plurality of first link lines.

The second link line can have a single whole electrode structure having a trapezoidal shape over the plurality of first link lines having the radial shape.

The display device can further comprise a contact hole exposing a portion of an upper surface of one end portion of the driving voltage line, the second link line can be electrically connected to the part of the driving voltage lines through the contact hole.

The display device can further comprise auxiliary link lines disposed between the plurality of first link lines on the same layer as that of the plurality of first link lines.

The auxiliary link line can be disposed between the first-second link line and the first-third link line.

The auxiliary link line can have a width relatively narrower than that of the first link line.

The auxiliary link lines can be connected to the driving voltage lines, respectively.

The auxiliary link line can have a width relatively narrower than that of the driving voltage line.

In a portion of the non-active area, the first-first link line, the first-second link line, the auxiliary link line, the first-third link line, and the first-fourth link line can be sequentially disposed in a repeated manner.

The display device can further comprise a plurality of contact holes disposed along the auxiliary link lines and exposing portions of upper surfaces of the auxiliary link lines, the second link line can be electrically connected to a plurality of the auxiliary link lines through the plurality of contact holes.

A plurality of contact portions connected to flexible films can be disposed at an upper end of the second link line.

The plurality of contact portions can be positioned above the auxiliary link lines between the first link lines.

Although the exemplary embodiments of the present disclosure have been described in detail with reference to the accompanying drawings, the present disclosure is not limited thereto and can be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto.

Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:

a display panel including an active area and a non-active area;

a plurality of data lines and a plurality of driving voltage lines disposed in the active area;

a plurality of first link lines disposed in the non-active area and connected to the plurality of data lines, respectively; and a second link line disposed over the plurality of first link lines and connected to a part of the plurality of driving voltage lines, wherein the plurality of first link lines are disposed on one side of the display panel, and extend radially from the non-active area towards the active area of the display panel, and wherein in a portion of the non-active area, the second link line covers an entirety of the plurality of first link lines in the portion where the plurality of first link lines extend radially toward the active area.

2. The display device of claim 1, wherein the plurality of first link lines include:

a first-first link line connected to a data line of a first sub-pixel disposed in the active area, a first-second link line connected to a data line of a second sub-pixel disposed in the active area, a first-third link line connected to a data line of a third sub-pixel disposed in the active area, and a first-fourth link line connected to a data line of a fourth sub-pixel disposed in the active area.

3. The display device of claim 2, wherein the first sub-pixel is a blue sub-pixel, the second sub-pixel is a green sub-pixel, the third sub-pixel is a red sub-pixel, and the fourth sub-pixel is a white sub-pixel.

4. The display device of claim 2, wherein the first to fourth sub-pixels configured to emit different color lights, and in a portion of the non-active area, the first-first link line, the first-second link line, the first-third link line, and the first-fourth link line are sequentially disposed in a repeated manner.

5. The display device of claim 2, wherein a distance between the first-second link line and the first-third link line is wider than a distance between first-first link line and the first-second link line or between the first-third link line and the first-fourth link line.

6. The display device of claim 2, wherein in another portion of the non-active area, the data line of the first sub-pixel, the data line of the second sub-pixel, the driving voltage line, the data line of the third sub-pixel, and the data line of the fourth sub-pixel are sequentially disposed in a repeated manner, and wherein the second link line is not disposed in the another portion of the non-active area.

7. The display device of claim 1, wherein the plurality first link lines, the plurality data lines, and the plurality driving voltage lines are disposed on a first layer of the display device, and wherein the second link line is disposed in a portion of the non-active area, and is disposed on a second layer of the display device, the second layer being above the first layer.

8. The display device of claim 7, wherein the display device includes at least one insulating layer interposed between the first layer and the second layer.

9. The display device of claim 1, wherein the second link line has a single electrode structure having a trapezoidal shape and is disposed over the plurality of first link lines having a radial shape.

10. The display device of claim 1, further comprising:

a contact hole exposing an upper surface of one driving voltage line among the plurality of driving voltage lines, wherein the second link line is electrically connected to the upper surface of the one driving voltage line through the contact hole.

11. The display device of claim 2, further comprising:

a plurality of auxiliary link lines disposed between the plurality of first link lines on a same layer as the plurality of first link lines.

12. The display device of claim 11, wherein one of the plurality of auxiliary link lines is disposed between the first-second link line and the first-third link line.

13. The display device of claim 11, wherein each of at least one of the plurality of auxiliary link lines has a width narrower than a width of one of the plurality of first link lines.

14. The display device of claim 11, wherein the plurality of auxiliary link lines are connected to the plurality of driving voltage lines, respectively.

15. The display device of claim 14, wherein each of at least one of the plurality of auxiliary link lines has a width narrower than a width of one of the plurality of driving voltage lines.

16. The display device of claim 11, wherein in a portion of the non-active area, the first-first link line, the first-second link line, the auxiliary link line, the first-third link line, and the first-fourth link line are sequentially disposed in a repeated manner.

17. The display device of claim 11, further comprising:

a plurality of contact holes disposed along the plurality of auxiliary link lines and exposing upper surfaces of the plurality of auxiliary link lines, wherein the second link line is electrically connected to the plurality of the auxiliary link lines through the plurality of contact holes.

18. The display device of claim 1, wherein the second link line includes a plurality of contact portions that are connected to flexible films and that are disposed at one end portion of the second link line.

19. The display device of claim 18, further comprising:

a plurality of auxiliary link lines disposed between the plurality of first link lines on a same layer as the plurality of first link lines, wherein the plurality of contact portions are respectively positioned above the plurality auxiliary link lines between the plurality of first link lines.

20. A display device, comprising:

a display panel including an active area and a non-active area adjacent to the active area;

a plurality of data lines and a plurality of driving voltage lines extending in the active area; and a link unit disposed in the non-active area, and including a plurality of first link lines extending radially towards the active area and a second link line covering an entirety of the plurality of first link lines in a portion where the plurality of first link lines extend radially toward the display area, wherein the plurality of first link lines are electrically and respectively connected to the plurality of data lines, and the second link line is electrically connected to one of the plurality of driving voltage lines.

21. The display device of claim 20, wherein the link unit further includes:

a plurality of auxiliary link lines each disposed between two adjacent first link lines among the plurality of first link lines, wherein a separation space between one of the auxiliary link lines and one of the two adjacent first link lines is greater than a separation space between the one of the two adjacent first link lines and a different adjacent first link line.

* * * * *